April 30, 1968   O. A. MALANGA   3,380,296
TIRE GAUGE AND MARKING DEVICE ASSEMBLY
Filed March 15, 1966
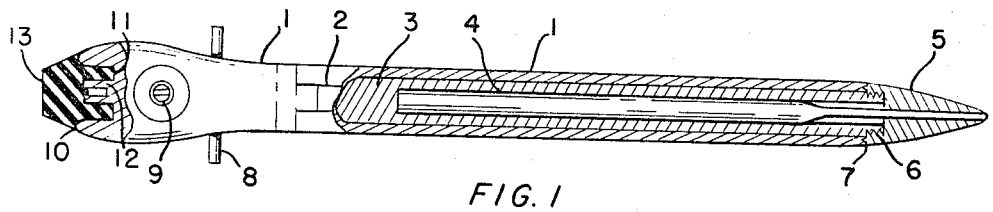
FIG. 1
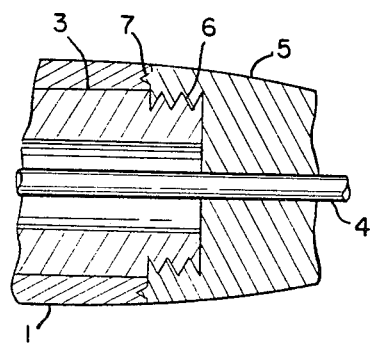
FIG. 4
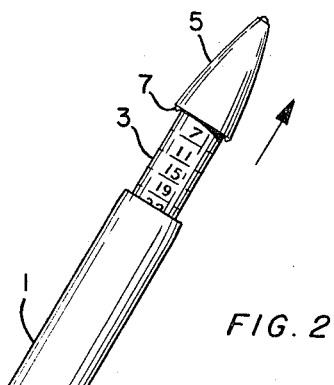
FIG. 2
FIG. 3
INVENTOR.
ORLANDO A. MALANGA
BY
Tom Sherrard, atty.
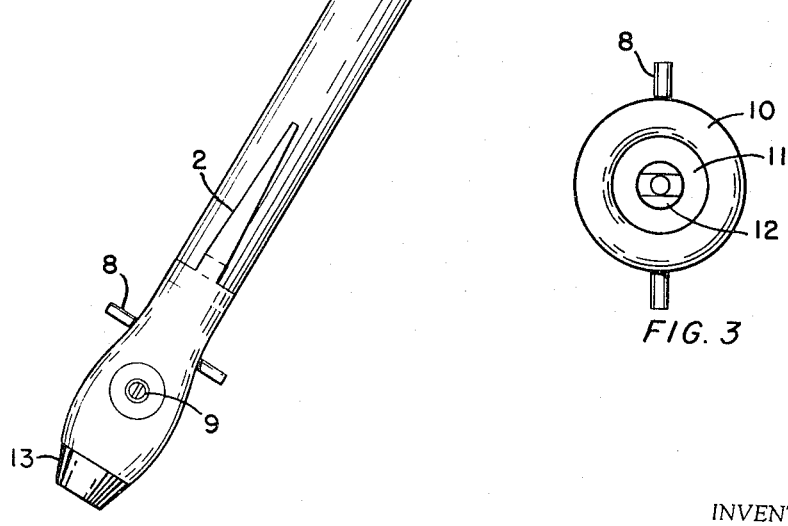

United States Patent Office 3,380,296
Patented Apr. 30, 1968

3,380,296
TIRE GAUGE AND MARKING DEVICE ASSEMBLY
Orlando A. Malanga, 3551 Paul Jones Ave.,
San Diego, Calif. 92117
Filed Mar. 15, 1966, Ser. No. 534,507
2 Claims. (Cl. 73—146.3)

ABSTRACT OF THE DISCLOSURE

A combination tool that permits the garage mechanic to remove and set valve cores, to gauge the fluid pressure in an inflated tire, and to mark reference points on tires as well as fill out tags and records associated with the repair project. The marking device is mounted in a hollow outer end of the pressure gauge stem which has piston means at its inner end responsive to tire pressure. At the closed end of the cylinder there is provided an axially directed valve core wrench, and a removable eraser especially shaped to conform to the working opening of the wrench.

Summary of the invention

An object of my invention is to provide such a device in a single assembly whereby an operator may perform several related functions during a tire changing operation. The same parts are used for multiple purposes all relating to tire servicing operations. In the trade the following continuity of steps are not uncommon: instructions to change tires are written; a tire is changed by releasing air pressure; tire is inflated and air pressure measured; small quantities of air may be released and thereafter the operator writes an invoice associated with the tire. One skilled in the art will readily see that an operator can use portions of my device to perform all of said steps.

Another object of the present invention is to provide a device of the above type which is of simple construction, inexpensive to manufacture, and efficient to operate.

Description of the drawing

For other objects and for a better understanding of the invention, reference may be had to the following detailed description taken in connection with the accompanying drawing, in which:

FIGURE 1 represents a side view of the complete assembly with a portion of the body member and a portion of the valve extractor cut away.

FIGURE 2 is a perspective view of my invention.

FIGURE 3 is a view thereof from the valve extractor end, and,

FIGURE 4 is a cross section detail showing a portion of the device approximate to the marking device end.

Description of the preferred embodiment

Referring to the drawing showing the preferred structure and in which like numbers represent like parts, in FIGURE 1 the number 1 applies to a hollow cylindrical body member. It may be of the type conventionally used in tire gauges with modifications as described herein. I prefer to construct same of light weight material so it may be easily held in the fingers when it functions as the barrel of a pen or pencil.

A conventional clip 2 may be secured to the outside of the body member. This permits the device to be clipped to a shirt pocket when not in use.

Stem 3 is slidably mounted within the body member. It is preferably cylindrical in shape and large enough to occupy substantially all of the inside of the body member as is illustrated. Customary indicia showing air pressure is provided on the outside of the stem. Journaled through the surface of the body member near the opposite end is the usual air inlet portion 9. Air from the tire valve enters the inside of the body member at 9 for air piston action on the stem in the well known manner.

My novel contribution to the art includes a marking means 5 secured to the end of stem 3 which protrudes from the body member. Such means may be tapered to a point as is shown. It has threaded engagement 6 with the end of the stem whereby marking devices or reservoirs of marking material, such as ink, may be easily replaced. The stem is hollow. The usual ball point pen ink cartridge 4 is retained therein. Other marking means may be used which will come within the broad aspects of my invention. For example, ordinary pencil "lead" may be used.

Item 7 denotes a one-half thread engagement between the marking device head and the body member. When the parts are so engaged the unit may conveniently be used as a marking device without movement of the stem in the direction of the arrow in FIGURE 2.

The body member may have a plurality of oppositely disposed studs 8 mounted on each side of the body member opposite the marking end thereof. Such studs are preferably two in number. They are of appropriate diameter to depress the stem of a valve core and they are of equal length and strength for use as a wrench handle in the fingers of the operator.

For easy use, even in the dark, my novel recessed valve core extractor and inserter 12 is featured. The lugs are recessed into the end of the body member whereby a sleeve is formed. The tool is then easily inserted over the valve which fits into the sleeve. See item 11 of FIGURE 1. The end 10 of the body portion is preferably rounded for easy engagement of the tire or inner tube valve.

A eraser 13 may fit onto the end of the body member. It may have an appropriate shape for retention by friction in sleeve 11.

The operation of this device is as follows:

Marking means 5 and member 1 are manually secured to each other by twisting the threads 7 together. The device may then be used for marking as is an ordinary pen or pencil. Mistakes, if any, may be erased by eraser 13. For use as a gauge the threads must be disengaged.

Upon untwisting the threads, item 9 is inserted over the tire valve. The tire air pressure is read on stem 3 in the usual manner. Excessive air may be released by depression of valve core stem with either stud 8.

If a valve core is to be removed or inserted, eraser 13 is removed and the wrench arrangement 12 and item 8 as handles are manually used to screw the valve core in or out of the tire valve. The walls of the valve fit into sleeve 11 for easy operation.

Although preferred embodiments of the device are as illustrated and described, it is to be understood that further modification and changes in the details of construction that may be resorted to will fall within the scope of the invention as claimed.

What is claimed is:

1. A tire tool and marking device for garage mechanics, comprising
   (a) an elongated tubular body portion having an open end and a closed end,
   (b) an air pressure gauge stem slidably received in said open end, said stem having air pressure indicia on the outer surface thereof and a piston means at its inner end, and
   (c) means adjacent said closed end for admitting air under pressure into said tubular body behind said piston means,
   (d) the outer end of said gauge stem being hollow and holding marking and writing means which projects axially from said outer end, (e) said closed end having a tire valve core removing wrench portion projecting axially and outwardly therefrom.

(f) said means for admitting air under pressure comprising a radially directed opening positioned inwardly of said wrench portion.

2. A structure as set forth in claim 1, said wrench portion comprising an annular sleeve, a notched stem concentrically positioned within said sleeve, and a removable eraser positioned within and shaped to conform to the opening defined by said sleeve and said stem.

References Cited

UNITED STATES PATENTS

| | | | |
|---|---|---|---|
| 33,091 | 8/1861 | Lawrence | 120—1 |
| 661,202 | 11/1900 | Wright | 133—138 |
| 1,415,628 | 5/1922 | Gielow | 7—1G3 |
| 1,806,849 | 5/1931 | Gelardi | 33—161 X |
| 2,363,545 | 11/1944 | Morehead | 120—1 |
| 2,686,445 | 8/1954 | Keck | 73—419 |
| 3,068,703 | 12/1962 | Morton | 73—419 |

LOUIS R. PRINCE, *Primary Examiner.*

D. E. CORR, *Assistant Examiner.*